US008583318B2

(12) United States Patent
Ross et al.

(10) Patent No.: US 8,583,318 B2
(45) Date of Patent: Nov. 12, 2013

(54) METHOD FOR CONDUCTING VEHICLE-RELATED SURVEY

(75) Inventors: Steven J. Ross, Livonia, MI (US); Christopher L. Oesterling, Troy, MI (US)

(73) Assignee: General Motors LLC, Detroit, MI (US)

(*) Notice: Subject to any disclaimer, the term of this patent is extended or adjusted under 35 U.S.C. 154(b) by 2088 days.

(21) Appl. No.: 11/467,327

(22) Filed: Aug. 25, 2006

(65) Prior Publication Data

US 2008/0051955 A1 Feb. 28, 2008

(51) Int. Cl.
*G06F 7/00* (2006.01)

(52) U.S. Cl.
USPC .......... 701/31.5

(58) Field of Classification Search
USPC .......... 701/29, 30, 33, 1, 29.1, 29.3, 29.6, 701/31.4, 31.5, 34.4
See application file for complete search history.

(56) References Cited

U.S. PATENT DOCUMENTS 5,442,549 A * 8/1995 Larson .......... 701/35
6,098,048 A * 8/2000 Dashefsky et al. .......... 705/10
6,728,612 B1 * 4/2004 Carver et al. .......... 701/33
6,954,689 B2 * 10/2005 Hanson et al. .......... 701/33
2005/0080606 A1 * 4/2005 Ampunan et al. .......... 703/8
2005/0171829 A1 * 8/2005 Doyle et al. .......... 705/8
2005/0187675 A1 * 8/2005 Schofield et al. .......... 701/2
2005/0187680 A1 * 8/2005 Kamdar et al. .......... 701/29

* cited by examiner

*Primary Examiner* — Thomas Black
*Assistant Examiner* — Ce Li
(74) *Attorney, Agent, or Firm* — Anthony Luke Simon; Reising Ethington P.C.

(57) ABSTRACT

A method for conducting a vehicle-related survey that gathers information regarding a specific area of interest from a vehicle user or vehicle hardware. In general, this method utilizes vehicle data to generate a survey having a variety of questions and instructions that are generally directed towards the area of interest. The instructions can be designed to place the vehicle into a predetermined configuration in an attempt to recreate a known vehicle problem or condition. Once the survey is generated, it is wirelessly sent from a call center or other remote facility to one or more vehicles over a wireless carrier system, and is then presented to the vehicle user. The responses provided can be stored locally, sent back to the call center for further analysis, or processed in a variety of different ways to find out more information regarding the area of interest.

23 Claims, 2 Drawing Sheets

METHOD FOR CONDUCTING VEHICLE-RELATED SURVEY

TECHNICAL FIELD

The present disclosure relates generally to a method for conducting a survey and, more particularly, to a method for conducting a vehicle-related survey where the survey is generated at a call center and is wirelessly transmitted to a vehicle telematics unit.

BACKGROUND OF THE INVENTION

In recent years, vehicle telematics systems have grown in popularity and are increasingly available in all types of vehicles. In general, telematics-based vehicle systems utilize a combination of wireless voice and data technologies to communicate between vehicle-installed hardware and a back-end system. These systems can provide numerous services including vehicle navigation, voice communication, remote diagnostics, vehicle data collection, and emergency services.

Telematics-equipped vehicles also provide the ability to administer a survey to a user presently located within or around the vehicle, hereafter referred to as an 'in-vehicle survey.' Traditionally, surveys have been administered according to one of a number of different techniques known in the art, but they can be particularly useful when they allow consumer feedback to be provided at the same time that the consumer is interacting with the product being evaluated.

SUMMARY OF THE INVENTION

According to one aspect of the present invention, there is provided a method for conducting a vehicle-related survey. The method comprises the steps of: (a) receiving vehicle data; (b) utilizing the vehicle data to generate a vehicle-related survey; (c) sending the vehicle-related survey to a vehicle; (d) presenting a vehicle user with question(s) from the vehicle-related survey; and (e) gathering response(s) that correspond to the question(s).

According to another aspect of the invention, there is provided a method for conducting an in-vehicle survey. The method comprises the steps of: (a) receiving vehicle data; (b) utilizing the vehicle data to generate an in-vehicle survey; (c) selecting a vehicle possessing characteristics relevant to an area of interest; (d) wirelessly sending the in-vehicle survey and a trigger event to the selected vehicle; (e) presenting a vehicle user with the plurality of questions; (f) gathering a plurality of responses that correspond to the plurality of questions; and (g) wirelessly sending the plurality of responses to a remote facility.

According to another aspect of the invention, there is provided a method for conducting a vehicle-related survey. The method comprises the steps of: (a) receiving vehicle data; (b) utilizing the vehicle data to generate a vehicle-related survey, wherein the survey includes at least one question and at least one instruction that are generally focused on an area of interest; (c) wirelessly sending the vehicle-related survey to a vehicle; (d) setting a trigger event; (e) administering the vehicle-related survey to a vehicle user after the occurrence of the trigger event; and (f) collecting at least one response from the vehicle user that corresponds to the question(s).

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The vehicle-related survey that is used in the present method generally seeks to gather first hand information from a vehicle user regarding a specific vehicle-related topic or area of interest. In general, the present method utilizes vehicle data, which can pertain to one or more aspects of the vehicle, to generate a vehicle-related survey having a variety of questions generally directed towards a particular topic or area of interest. Once the vehicle-related survey is generated, it is wirelessly sent from a call center to one or more vehicles over a wireless communications network so that the vehicles can then present the questions to a vehicle user. The responses provided by the vehicle user can then be stored locally, sent back to the call center for further analysis, and/or processed in one of a number of different ways.

Communications System—

Figure 1:
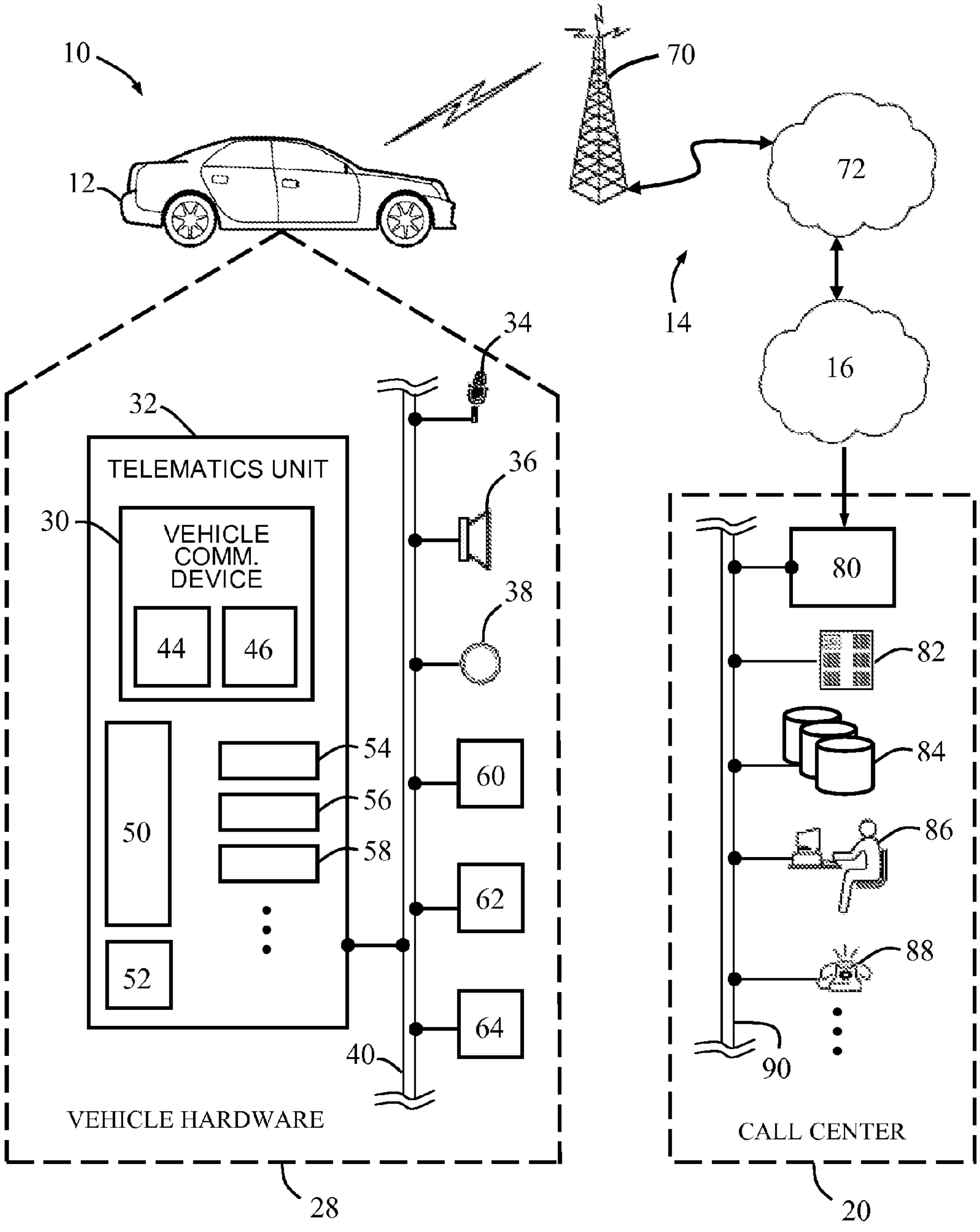
FIG. 1 is a block diagram depicting an exemplary embodiment of a communications system that is capable of utilizing the disclosed method.

Turning now to FIG. 1, there is shown an example of a communications system 10 that is capable of conducting the vehicle-related survey discussed below. Communications system 10 generally includes a vehicle 12, a wireless carrier system 14, a communications land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the disclosed method as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a telematics unit 32, a microphone 34, a speaker 36, buttons and/or controls 38, and several vehicle electronic modules (VEMs) 60-64 that are interconnected using a network connection or communications bus 40. Examples of suitable network connections include a controller area network (CAN), a media oriented system transfer (MOST), a local interconnection network (LIN), an ethernet, and other appropriate connections such as those that conform with known ISO, SAE and IEEE standards and specifications, to name but a few.

The telematics unit 32 includes a vehicle communication device 30 that enables the telematics unit to communicate with the call center 20. Vehicle communications device 30 preferably uses radio transmissions to establish either a communications channel with wireless carrier system 14 so that both voice and data transmissions can be sent and received over the channel. By providing both voice and data communication, vehicle communications device 30 enables the vehicle to offer a number of different services including those related to navigation, telephony, emergency assistance, diagnostics, infotainment, surveys, etc. According to one embodiment, vehicle communications device 30 includes a standard cellular chipset 44 for voice communications like hands-free calling, and a modem 46 for data transmission. In order to enable successful data transmission over a voice channel, modem 46 can apply some type of encoding or modulation to convert the digital data so that it can communicate through a vocoder or speech codec incorporated in chipset 44. Any suitable encoding or modulation technique that provides an acceptable data rate and bit error rate can be used with the disclosed method.

The telematics unit 32 is an onboard device that provides a variety of services through its communication with call center 20, and generally includes an electronic processing device 50, one or more types of electronic memory 52, and a number of function-specific devices or modules 54-58. The telematics unit 32 can provide a variety of different services including, for example: vehicle emissions data reporting; turn-by-turn directions and other navigation-related services which are provided in conjunction with a GPS-based vehicle navigation unit 54; airbag deployment notification and other emergency or roadside assistance-related services which are provided in connection with various sensors and modules 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable vehicle mounted telematics unit that can provide the above-identified services is already known and will not be reiterated here.

Vehicle hardware 28 includes a number of devices that provide vehicle occupants with a means of communicating with and through the various components of the vehicle. Such devices may include microphone 34, speakers 36, buttons and/or controls 38, and a visual display, such as a heads-up display or a graphic display in the instrument panel. These devices allow a user to input commands, receive audio/visual feedback, and provide voice communications. Microphone 34 provides an occupant with a means for inputting verbal or other auditory commands, and can be connected to a voice processing unit utilizing human-machine interface (HMI) technology known in the art. Conversely, speaker 36 provides verbal output to a vehicle occupant and can be a dedicated, stand-alone speaker or part of the vehicle audio system. In either event, microphone 34 and speaker 36 enable vehicle hardware 28 and call center 20 to communicate with the occupants through audible speech. Buttons and/or controls 38 enable a vehicle occupant to activate or engage one or more of the vehicle hardware components 28. For instance, button 38 can be an electronic push-button used to initiate voice communication with call center 20 or to initiate a vehicle emissions data request.

The vehicle electronic modules (VEMs) 60-64 are generally electronic hardware components that are located throughout the vehicle and typically receive input from one or more sensors and use the sensed input to perform diagnostic, monitoring, control, reporting and/or other functions. Each of the VEMs 60-64 is preferably connected by communications bus 40 to the other VEMs, as well as to the telematics unit 32, and can be programmed to run vehicle system and subsystem diagnostic tests. As examples, VEM 60 can be an engine control module (ECM) that controls various aspects of engine operation such as fuel ignition and ignition timing, VEM 62 can be a powertrain control module that regulates operation of one or more components of the vehicle powertrain, and VEM 64 can be a body control module that governs various electrical components located throughout the vehicle, like the vehicle's power door locks and headlights. According to one embodiment, engine control module 60 is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VEMs are only examples of some of the modules that may be used in vehicle 12, as numerous others are also possible.

Wireless carrier system 14 is preferably a cellular telephone system, but could be any other suitable wireless system, such as a satellite-based system, that transmits signals between the vehicle hardware 28 and call center 20. According to an exemplary embodiment, wireless carrier system 14 includes one or more cell towers 70, base stations and/or mobile switching centers (MSCs) 72, as well as any other networking components required to connect the wireless system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within the MSC or some other network component as well.

Land network 16 can be a conventional land-based telecommunications network that is connected to one or more landline telephones and connects wireless carrier network 14 to call center 20. For example, land network 16 can include a public switched telephone network (PSTN) and/or a network configured with a TCP/IP protocol suite, as is appreciated by those skilled in the art. Of course, one or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof Furthermore, call center 20 need not be connected via land network 16, but could include wireless telephony equipment so that it can communicate directly with wireless network 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store information on the various DTCs that are used, or it could store subscriber authentication information, profile records, behavioral patterns, and other pertinent subscriber information. Data transmissions may also be conducted by wireless systems, such as, for example 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Method for Conducting a Vehicle-Related Survey—

Figure 2:
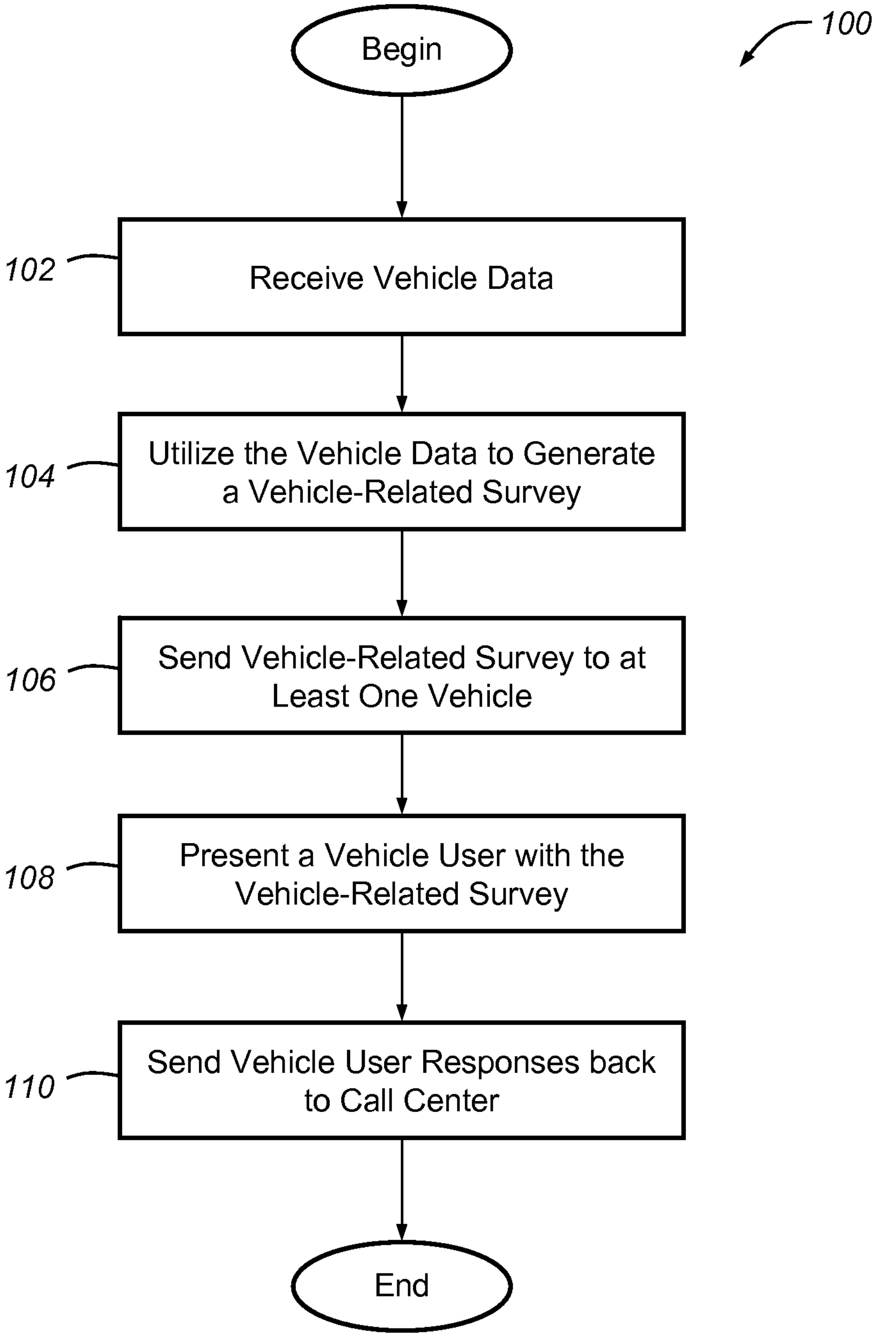
FIG. 2 is a flowchart demonstrating an embodiment of a method for conducting a vehicle-related survey.

Turning now to FIG. 2, there is shown an embodiment 100 of a method for conducting a vehicle-related survey, where the method utilizes vehicle data to generate a survey that is generally focused on a particular topic or area of interest, and then sends that survey to a vehicle for presentation to a user. Method 100 is preferably implemented in the form of software instructions, which may reside in electronic memory devices located in call center 20, vehicle hardware 28, and/or an intermediary system component, to name but a few possibilities. Furthermore, the vehicle-related survey may be generated with or without human intervention, depending upon the particular implementation of the method.

According to this particular embodiment, the method begins with step 102, which involves receiving vehicle data from one of a number of possible sources. The term 'vehicle data' broadly includes any information pertaining to the vehicle and can include, but is certainly not limited to, diagnostic trouble codes (DTCs), vehicle sensor readings, environmental sensor readings, vehicle system or sub-system status reports, vehicle identification numbers (VINs), vehicle locations, vehicle maintenance histories, or observations from the vehicle user. It should be appreciated that there are certain advantages to using the method described herein with a captured test fleet of vehicles; that is, a group of vehicles that are generally under a particular entity's control and are used to gather information to aid that entity in the areas of vehicle design, improvement, maintenance, etc. Thus, the vehicle user referred to above can be, but is not required to be, an engineer, a vehicle designer, a mechanic, a test driver, a member of a focus group, or some other individual trained to provide observations regarding different aspects of the vehicle. For example, as the vehicle user is either driving or riding in the vehicle, they may provide verbal or electronically-inputted observations regarding everything from wind noise to the comfort of the seats. These types of personal observations can be helpful in that they provide qualitative information regarding a current aspect of the vehicle; information that may not be otherwise available through electronic sensors and the like.

In a preferred embodiment, the vehicle data received in step 102 is a DTC that is automatically generated by a VEM 60-64 and is sent from vehicle telematics unit 32 to call center 20 over wireless carrier system 14. However, it should be appreciated that the vehicle data does not need to come directly from the vehicle, as it could be received from a different source such as an engineering facility, etc. For instance, if an engineering group is monitoring a captured test fleet of vehicles and makes certain observations regarding those vehicles, step 102 could receive the vehicle data from the engineering group over a wired or wireless network instead of receiving it directly from vehicle 12. Depending upon the particular setup, telematics unit 32 can send the vehicle data to call center 20 in real-time as the data is generated, it can periodically send the vehicle data according to some schedule, or it can send the vehicle data in response to an event like the beginning of an ignition cycle or a request from the call center.

Furthermore, the transmission of the vehicle data can be an automated process or it can be user-initiated. Where step 102 is user-initiated, the vehicle data is still preferably sent using telematics unit 32, but instead of being automatically sent without any user intervention, it is sent at the user's behest, such as by engaging controls 38. It is also possible for the vehicle data to be sent by some means other than telematics unit 32. For instance, a user could send vehicle data to call center 20 by using a cellular phone, by e-mailing the data, by entering the information through a website, or by using a personal digital assistant (PDA), to name but a few of the possibilities. Once the vehicle data has been successfully received at the call center, it can be stored in a variety of locations including database 84.

Next, step 104 utilizes the vehicle data to generate a vehicle-related survey that includes one or more questions. It is preferable that the survey be an in-vehicle survey that is at least generally focused on a topic or area of interest pertaining to the vehicle data previously collected. Targeted or focused surveys such as this can be useful when an entity has identified a specific problem or issue that it wishes to resolve, as is often times the case when a certain defect is spotted across a number of different vehicles. For example, if it is noticed that several vehicles in a captured test fleet are experiencing ignition timing problems (as evidenced by DTCs or other vehicle data sent by the vehicles), then step 104 could generate an 'ignition timing' survey that includes a number of questions designed to gather information on various factors that could affect the ignition timing. In another example, if the entity is interested in the design of the vehicle instrumentation (possibly because of vehicle data provided by industry studies, focus groups, etc.), then step 104 could generate an 'instrumentation' survey designed to gather various pieces of information on the design, tactile feel, visibility, usefulness, etc. of the vehicle's instrumentation. In any event, the vehicle-related survey should generally be targeted or focused on some aspect relating to the vehicle data that was provided.

The vehicle-related survey can also include one or more instructions that are designed to place the vehicle into a predetermined configuration in an attempt, for example, to recreate a known vehicle problem, to test a problem resolution theory, or to test certain features so that feedback can be solicited. Some instructions cause components of the vehicle hardware 28 to automatically manipulate one or more aspects of the vehicle so that information that is affected by that manipulation can be gathered. In contrast, other instructions are aimed at the vehicle user and direct them to manually manipulate one or more aspects of the vehicle so that information, such as personal observations, which is affected by the manipulations can be gathered and sent to the call center for processing. For instance, in the 'ignition timing' survey example above, the vehicle-related survey generated in step 104 may include instructions directed to vehicle hardware 28 that automatically places the vehicle in a predetermined condition, such as by configuring VEMs 60-64 to emulate certain driving or environmental conditions, or by controlling certain aspects of the ECM. In the previous 'instrumentation' survey example, the vehicle-related survey may include instructions directing the vehicle user to manually engage certain features of the vehicle's audio system, trip computer, and/or heating, ventilating and air-conditioning (HVAC) system, so that specific feedback can be gathered with respect to these features.

It should be appreciated that step 104 can utilize computer applications or programs to automatically select the various questions and/or instructions in the survey, or they can be generated by a technician at call center 20 or some other facility. According to one approach, the questions in the vehicle-related survey are automatically selected from question groups that each has a number of predetermined questions relating to a certain aspect of the vehicle. The survey questions may be organized in a simple series, or they may be driven by a logic algorithm or a decision tree. The logic algorithm may change the order of the questions or may change a question itself based on a user's response.

Once the vehicle-related survey is established, step 106 sends the survey to at least one vehicle. As previously mentioned, it is preferable that the vehicle-related survey be developed at call center 20 and then be wirelessly distributed to the telematics unit(s) of one or more vehicles 12 that are part of a captured test fleet. The decision as to which vehicles will be sent the survey can be made according to a number of different techniques, including selecting the recipient vehicles based on their characteristics or by using known statistical analyses or random samplings, to name but a few. In the event that the selected vehicles are chosen because of one or more characteristics that they possess, appropriate criteria can include, but is not limited to, a vehicle identification number (VIN), a vehicle make and/or model, a vehicle option package, a vehicle maintenance history, and a geographic area. In a preferred embodiment, the vehicles selected in step 106 share a common characteristic or attribute (certain engine option package, manufactured at the same facility around the same time, etc.) that generally relates to the vehicle data received in step 102. For example, collected vehicle data may show that a variety of different vehicles all having the same engine option package are experiencing a common issue. The vehicle-related survey generated in step 104 can then be directed to that common issue, and the vehicles selected in step 106 can be chosen on the basis of whether or not they have that common engine option package.

After the survey is received at the vehicle, the various questions and/or instructions in the survey are presented to one or more vehicle users, step 108. Generally, the survey questions are designed to solicit information from the vehicle hardware 28 and/or the vehicle user. In the hardware example, data in the form of sensor readings, performance histories, DTCs, etc. can be provided to telematics unit 32 via vehicle bus 40 for subsequent transmission back to the call center or another facility. For those questions and/or instructions that are put to the vehicle user, the user can respond using audible speech which is received by microphone 34 and is processed by some type of human-machine interface (HMI), such as a hands-free voice recognition feature. The question and response interaction between the user and the vehicle hardware may, of course, be conducted through other means including buttons and/or controls 38, a graphic display such as an interactive touch screen, or simply by using vehicle communications device 30 to speak with an operator or automated service housed at call center 20, for example. The responses provided by the vehicle user can either be communicated back to the call center as they are given, or the collection of responses can be gathered and sent in a single transmission, step 110.

The presentation of the vehicle-related survey in step 108 typically occurs in response to some type of trigger event. A 'trigger event' broadly includes any event that can be detected by the vehicle hardware 28 and that initiates the presentation of the vehicle-related survey to either a vehicle user and/or the vehicle hardware. For example, the trigger event can include, but is not limited to, an ignition cycle (i.e. initiate the vehicle-related survey the next time the vehicle is turned on or off), a trigger signal sent by call center 20 or some other signal source, an amount of distance traveled by the vehicle (i.e. initiate the vehicle-related survey after the vehicle has traveled 100 miles), a date and time (i.e. initiate the vehicle-related survey on Friday, Aug. 11, 2006 at 12:00 P.M.), a vehicle status (i.e. initiate the vehicle-related survey the next time the vehicle is put in park, neutral or drive), or the receipt of a DTC. According to one approach, a trigger event is established in the telematics unit 32 of each of the vehicles of the captured test fleet before any vehicle-related survey is created and distributed. That way, when a vehicle-related survey is sent to the vehicle in step 106, the vehicle is already programmed with a trigger event that will begin the presentation of that survey. According to another embodiment, the trigger event is transmitted with the vehicle-related survey in step 106 so that each survey is initiated in response to a trigger event that is specifically selected to be most appropriate for that survey.

While the vehicle-related survey is being conducted, additional data and information can be collected from the vehicle hardware 28 along with the survey responses. The additional data and information may relate to the original vehicle data or it can pertain to some other aspect of the vehicle. For instance, in the 'ignition timing' survey example above, in addition to asking the vehicle user questions about the operation of the engine, it may be helpful for the vehicle hardware to gather information as to the temperature and/or humidity of the surrounding atmosphere. This information can be sent by telematics unit 32 to call center 20 as a separate transmission or it can be incorporated with the responses from the survey.

According to an optional feature of method 100, the information collected and sent back to the call center in step 110 can be used to revise or further refine the vehicle-related survey. In this sense, the generation of the vehicle-related survey is a reiterative process, where the survey is being further refined and enhanced with each cycle in order to more precisely focus in on the problem at hand. Of course, at some point the responses and information generated by the vehicle-related survey may show that there is no need for additional surveys, which effectively ends method 100. Alternatively, the responses to the vehicle-related survey, along with any additional data and information, may illuminate a new area of interest where additional surveys are needed. Method 100 could then start again in order to generate and present a vehicle-related survey focused on a second topic or area of interest.

The following example is provided in order to demonstrate one manner in which method 100 may be employed; however, it should be appreciated that this is only one embodiment of the present method and in no way limits the present method's application to other embodiments. Beginning with step 102, call center 20 receives vehicle data in the form of verbal observations from the vehicle user regarding a squeaky glove box. The vehicle user initiates a wireless connection between telematics unit 32 and call center 20 by engaging control button 38, and then verbally describes the observations. Once the vehicle data is received by call center 20, a vehicle-related survey having a variety of questions and instructions that are focused on glove box-related issues is automatically generated, step 104. Next, resources at call center 20 identify a group of vehicles within the captured test fleet that have similar glove box mechanisms; the 'glove box' survey, along with a trigger event, is wirelessly sent to these vehicles, step 106. The trigger event used here is the next ignition cycle so that the next time the vehicle is turned on, the vehicle hardware 28 presents the vehicle user with the 'glove box' survey, step 108. The targeted survey includes a variety of questions and instructions relating to the glove box, and solicits verbal responses from the vehicle user. One of the instructions may request that the vehicle user open and close the glove box several times and provide feedback as to the noise associated with that action, the smoothness of the glove box operation, the quality of the locking or the securing mechanism, etc. The responses are then processed through an HMI feature and are digitized for wireless transmission back to call center 20, step 110. The call center then processes the responses and, depending on the nature of the responses and the problem at hand, may generate a follow-up survey to again present to the vehicle user. This process continues until the call center or other facility handling the vehicle-related survey is satisfied that it has gathered all of the information that it needs, at which time the responses can be processed by analysts or others skilled in that art.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for conducting a vehicle-related survey, comprising the steps of:

(a) receiving vehicle data;

(b) utilizing the vehicle data to generate the vehicle-related survey for a vehicle user, wherein the survey includes at least one question;

(c) sending the vehicle-related survey to a vehicle using a vehicle telematics unit;

(d) presenting the vehicle user with the question(s) from the vehicle-related survey; and (e) gathering at least one response that corresponds to the question(s).

2. The method of claim 1, wherein the vehicle data of step (a) is sent by a vehicle telematics unit to a call center over a wireless carrier system.

3. The method of claim 2, wherein the vehicle telematics unit automatically sends the vehicle data to the call center, and wherein the vehicle data includes at least one piece of data selected from the group consisting of: a diagnostic trouble code (DTC), a vehicle sensor reading, an environmental sensor reading, a vehicle status report, a vehicle identification number (VIN), a vehicle location, and a vehicle maintenance history.

4. The method of claim 1, wherein the vehicle data of step (a) is an observation that is sent by a vehicle user to a call center.

5. The method of claim 1, wherein step (b) further includes utilizing a computer program to automatically select the question(s) in the vehicle-related survey from a group of predetermined questions, wherein the selection is at least partially based on the vehicle data.

6. The method of claim 1, wherein the vehicle-related survey includes a question that requires the vehicle user to make a personal observation regarding a current aspect of the vehicle.

7. The method of claim 1, wherein the vehicle-related survey of step (b) further includes at least one instruction that directs the vehicle user to manipulate an aspect of the vehicle so that information that is affected by the manipulated aspect can be gathered.

8. The method of claim 7, wherein the instruction(s) is used to place the vehicle into a predetermined configuration in an attempt to re-create a known vehicle problem or condition.

9. The method of claim 1, wherein the vehicle-related survey of step (b) further includes at least one instruction that causes the vehicle hardware to automatically manipulate an aspect of the vehicle so that information that is affected by the manipulated aspect can be gathered.

10. The method of claim 9, wherein the instruction(s) is used to place the vehicle into a predetermined configuration in an attempt to re-create a known vehicle problem or condition.

11. The method of claim 1, wherein step (b) further includes establishing a trigger event whose occurrence initiates step (d), wherein the trigger event includes at least one event selected from the group consisting of: an ignition cycle, a trigger signal, an amount of distance traveled, a date and time, a vehicle status, and receipt of a diagnostic trouble code (DTC).

12. The method of claim 1, wherein step (c) further includes selecting the vehicle from a captured test fleet based on at least one piece of data selected from the group consisting of: a vehicle identification number (VIN), a vehicle make and/or model, a vehicle option package, a vehicle maintenance history, and a geographic area.

13. The method of claim 1, wherein step (c) further includes utilizing a call center and a vehicle telematics unit to wirelessly send the vehicle-related survey to the vehicle over a wireless carrier system.

14. The method of claim 1, wherein steps (d) and (e) further include utilizing a human-machine interface (HMI) to: present the vehicle user with the question(s) while the user is presently located within the vehicle, and gather the response(s) corresponding to the question(s).

15. A method for conducting an in-vehicle survey, comprising the steps of:

(a) receiving vehicle data;

(b) utilizing the vehicle data to generate an in-vehicle survey, wherein the in-vehicle survey includes a plurality of questions that are generally focused on an area of interest;

(c) selecting a vehicle possessing characteristics that are relevant to the area of interest;

(d) wirelessly sending the in-vehicle survey and a trigger event to a telematics unit of the selected vehicle;

(e) presenting a vehicle user with the plurality of questions in response to the occurrence of the trigger event;

(f) gathering a plurality of responses from the vehicle user that correspond to the plurality of questions; and (g) wirelessly sending the plurality of responses to a remote facility for analysis.

16. The method of claim 15, wherein the vehicle data of step (a) is automatically sent by a vehicle telematics unit to a call center over a wireless carrier system, and includes at least one piece of data selected from the group consisting of: a diagnostic trouble code (DTC), a vehicle sensor reading, an environmental sensor reading, a vehicle status report, a vehicle identification number (VIN), a vehicle location, vehicle maintenance history, and an observation from a vehicle user.

17. The method of claim 15, wherein step (b) further includes utilizing a computer program to automatically select the plurality of questions in the in-vehicle survey from a group of predetermined questions, wherein the selection is at least partially based on the vehicle data.

18. The method of claim 15, wherein the in-vehicle survey of step (b) further includes at least one instruction that directs the vehicle user to manipulate an aspect of the vehicle so that information that is affected by the manipulated aspect can be gathered.

19. The method of claim 18, wherein the instruction is used to place the vehicle into a predetermined configuration in an attempt to re-create a known vehicle problem or condition.

20. The method of claim 15, wherein the in-vehicle survey of step (b) further includes at least one instruction that causes the vehicle hardware to automatically manipulate an aspect of the vehicle so that information that is affected by the manipulated aspect can be gathered.

21. The method of claim 20, wherein the instruction is used to place the vehicle into a predetermined configuration in an attempt to re-create a known vehicle problem or condition.

22. The method of claim 15, further comprising: (h) utilizing the plurality of responses to develop a second, refined vehicle-related survey that is based on the responses of the first vehicle-related survey.

23. A method for conducting a vehicle-related survey comprising the steps of:

(a) receiving vehicle data provided by a vehicle user;

(b) utilizing the vehicle data to generate a vehicle-related survey, wherein the survey includes at least one question and at least one instruction that are generally focused on an area of interest;

(c) wirelessly sending the vehicle-related survey to a vehicle using a vehicle telematics unit;

(d) setting a trigger event;

(e) administering the vehicle-related survey to a vehicle user after the occurrence of the trigger event, wherein the administration of the vehicle-related survey causes the vehicle to be placed in a predetermined configuration in an attempt to re-create a known vehicle problem or condition; and (f) collecting at least one response from the vehicle user that corresponds to the question(s).

* * * * *